United States Patent
Jegorel et al.

(10) Patent No.: US 11,866,363 B2
(45) Date of Patent: Jan. 9, 2024

(54) GLASS-CERAMIC PLATE FOR FIREPLACE INSERT AND MANUFACTURING PROCESS

(71) Applicant: EUROKERA S.N.C., Chateau-Thierry (FR)

(72) Inventors: Theo Jegorel, Paris (FR); Clément Sieutat, Chateau-Thierry (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 209 days.

(21) Appl. No.: 16/976,096

(22) PCT Filed: Mar. 14, 2019

(86) PCT No.: PCT/FR2019/050560
§ 371 (c)(1),
(2) Date: Aug. 27, 2020

(87) PCT Pub. No.: WO2019/175506
PCT Pub. Date: Sep. 19, 2019

(65) Prior Publication Data
US 2020/0399172 A1 Dec. 24, 2020

(30) Foreign Application Priority Data

Mar. 14, 2018 (FR) ...................... 1852203

(51) Int. Cl.
| | |
|---|---|
| *C03C 17/34* | (2006.01) |
| *C03C 23/00* | (2006.01) |
| *F24B 1/192* | (2006.01) |
| *F24B 1/193* | (2006.01) |
| *F24C 15/04* | (2006.01) |
| *B82Y 30/00* | (2011.01) |

(52) U.S. Cl.
CPC ........ *C03C 17/3435* (2013.01); *C03C 23/007* (2013.01); *F24B 1/192* (2013.01); *F24B 1/193* (2013.01); *F24C 15/04* (2013.01); *B82Y 30/00* (2013.01); *C03C 2217/281* (2013.01); *C03C 2217/948* (2013.01); *C03C 2218/156* (2013.01)

(58) Field of Classification Search
None
See application file for complete search history.

(56) References Cited

U.S. PATENT DOCUMENTS

| | | | |
|---|---|---|---|
| 5,070,045 A | 12/1991 | Comte et al. | |
| 2004/0253471 A1* | 12/2004 | Thiel | B32B 17/10018 428/544 |
| 2006/0024509 A1 | 2/2006 | Vilato et al. | |
| 2009/0320824 A1* | 12/2009 | Henn | C03C 17/3435 204/192.15 |
| 2014/0334805 A1* | 11/2014 | McLean et al. | H05B 3/009 392/411 |
| 2015/0070755 A1 | 3/2015 | Singh et al. | |
| 2016/0214887 A1* | 7/2016 | Illy | F24C 15/005 |
| 2016/0229741 A1 | 11/2016 | Canova et al. | |
| 2018/0237899 A1* | 8/2018 | Lu | C23C 14/0641 |

FOREIGN PATENT DOCUMENTS

| | | |
|---|---|---|
| EP | 0437228 A1 | 7/1991 |
| EP | 3141534 A1 | 3/2017 |
| FR | 3010074 A1 * | 3/2015 ........... C03C 17/245 |
| WO | WO-2006021712 A1 | 3/2006 |
| WO | WO-2013140061 A1 | 9/2013 |
| WO | WO-2015055944 A1 | 4/2015 |

OTHER PUBLICATIONS

International Search Report dated Jun. 26, 2019 in PCT/FR2019/050560 filed Mar. 14, 2019 (with English translation), 8 pages.

\* cited by examiner

*Primary Examiner* — David Sample
(74) *Attorney, Agent, or Firm* — Element IP, PLC

(57) ABSTRACT

The present invention relates to a plate, intended to equip appliances of the chimney insert, stove, chimney, boiler, heating appliance, fireplace or equivalent type and/or to serve as a fire barrier, said plate being formed of at least one glass-ceramic substrate coated on at least one of its faces with the following stack of layers:

1. a first metal nitride layer of thickness comprised in the range from 5 nm to 50 nm,
2. an indium tin oxide layer of less than 100 nm thickness,
3. a second metal nitride layer of thickness comprised in the range from 10 nm to 100 nm.

The present invention also relates to a process for obtaining said plate, as well as a device incorporating said plate.

20 Claims, No Drawings

GLASS-CERAMIC PLATE FOR FIREPLACE INSERT AND MANUFACTURING PROCESS

The present invention relates to the field of glass-ceramics. More precisely, it relates to a glass-ceramic plate for devices subjected to high temperatures, in particular a plate intended to equip an appliance of the chimney insert, stove, chimney, boiler, heating appliance, fireplace or equivalent type, and/or to serve as a fire (or flame) barrier, said plate generally constituting the front glass of said appliance, said plate which can, if the need arises, be curved or bent and which can, if the need arises, be provided with decorative or functional accessories or additional elements required for its use. The present invention also relates to a process for manufacturing said plate.

A glass-ceramic is originally a glass, known as precursor glass or mother glass or green glass, the specific chemical composition of which makes it possible to bring about controlled crystallization by means of suitable heat treatments, known as ceramization. This specific, partly crystallized structure gives glass-ceramics unique properties.

Traditionally, glass-ceramic plates are used as cooktops, but they can also be used in other applications, for example to form chimney inserts.

In order to take advantage of the pleasure of observing fireplaces in operation within insert-type appliances, they are generally fitted with a window or glass part, particularly in the front facade of the appliance, most often integrated in a door allowing access to the fireplace, this window can in particular be made of glass or glass-ceramic, these materials having good temperature resistance and a low coefficient of thermal expansion. In open fireplace type installations, the same view and protection functions can also be provided by a flame barrier made of one of these materials.

When using these devices or systems, the glass parts in particular can reach temperatures of up to 600° C. For reasons of safety and optimization of heating, it is known to provide these glass parts with heat (i.e. thermal/infrared radiation)-reflecting coatings, such as coatings based on metal oxides, which may be doped if need be, for example tin oxide coatings, in particular doped tin oxide, or tin and indium oxide (or tin-doped indium oxide), etc., these coatings typically having a thickness of a few hundred nanometers.

Adding such an infrared radiation-reflecting coating on said glass parts has multiple advantages such as reducing the temperature perceptible on and around said parts, increasing user comfort and safety, improving and optimizing combustion, reducing the number of fine particles in the air, reducing window soiling by pyrolytic effect, etc.

However, a disadvantage of most of these coatings, beyond their sometimes-high cost, is that their properties can degrade over time due to the fact that they are subject to large temperature variations. They usually lose their reflective effect when they are heated for long periods of time at high temperature, as in the case of chimney inserts. In particular, after about one hundred hours of use at temperatures above 250° C., they lose their reflection/low heat-emissivity properties, even when protected by another layer acting as a barrier or protection.

In addition, applying these coatings on glass-ceramics can cause problems when said glass-ceramics are bent, for example, the addition of these coatings before bending and ceramization being generally not possible because these coatings can be destroyed during ceramization, and adding them after ceramization posing problems in terms of obtaining a homogeneous thickness.

The present invention has therefore sought to develop improved glass-ceramic products, in particular new glass-ceramic plates intended to be used in installations or devices subject to high temperatures, in particular intended to equip appliances of the chimney insert, stove, chimney, boiler, heating appliance, fireplace or equivalent type and/or to serve as fire barriers, these plates not exhibiting these aging problems and effectively reflecting infrared radiation (thermal radiation) without degradation of their low-emissivity properties under conditions of high temperatures and over time, and without detriment to the other properties sought for the applications considered (modifications to the glass-ceramic plates and/or to the process for obtaining them or their association with other materials with different characteristics which may indeed be detrimental to the other properties sought), such as sufficient transmittance in the wavelengths of the visible range (to retain the attractive visual appearance of the active fireplace within the appliances), sufficient mechanical strength (resistance to pressure, to shocks, etc.), and ease of maintenance and cleaning.

This purpose has been achieved by the plate according to the invention, intended to equip appliances of the chimney insert, stove, chimney, boiler, heating appliance, fireplace or equivalent type and/or to serve as a fire barrier, said plate being formed of at least (or comprising at least) one glass-ceramic substrate coated on at least one of its faces with the following stack of layers:
 1) a first metal nitride layer of thickness comprised in the range from 5 nm to 50 nm (inclusive),
 2) an indium tin oxide (ITO) layer of less than 100 nm thickness,
 3) a second metal nitride layer of thickness comprised in the range from 10 nm to 100 nm (inclusive).

Advantageously, the oxygen content in each of said first metal nitride layer and second metal nitride layer is in addition less than 1% by weight. The oxygen content in the layer is evaluated by microanalysis, in particular by secondary ion mass spectrometry (SIMS), using in particular a TQF SIMS 5 spectrometer marketed by the company IONTOF.

The order of the layers is advantageously the order in which the layers are cited, i.e. 1/2/3, this order also being that of the layers starting from the substrate and moving outwards (in other words, of the three layers, layer 1 is the closest to the substrate).

Also advantageously, layer 1 is in direct contact with layer 2, and layer 2 is in direct contact with layer 3; in other words, layer 3 is (deposited), directly (with no intermediate layer), on layer 2, and layer 2 is itself (deposited), directly (with no intermediate layer), on layer 1. In particular, no oxide layer is present between layers 1 and 2 and layers 2 and 3.

In addition, the aforementioned stack of layers (or the coating formed at least of said stack) is preferably located on the outer face of the plate, i.e. the face intended to face the outside of the appliance into which the plate is to be integrated, this face not being in direct contact with the heat source during operation of the appliance. The glass-ceramic substrate is advantageously coated over the totality of said face.

The invention also relates to a process for manufacturing said plate, formed of at least one glass-ceramic substrate, in which are successively deposited by magnetron sputtering, on at least one face of said substrate, in the following order:
 1) a first metal nitride layer of thickness comprised in the range from 5 nm to 50 nm,
 2) an indium tin oxide layer of less than 100 nm thickness,
 3) a second metal nitride layer of thickness comprised in the range from 10 nm to 100 nm.

Advantageously, the deposition of the first metal nitride layer and the deposition of the second metal nitride layer each take place under a pressure of at most 3.5 μbar.

Advantageously also, the atmosphere (consisting of plasmagen gas such as argon and nitrogen) during the deposition of each of said first metal nitride layer and second metal nitride layer (in each chamber where these deposits are made) comprises less than 1% by volume of oxygen (which may be residual in the chamber or possibly supplied), or is even devoid of oxygen. Preferably, the flow rate of oxygen during the deposition of each of said first metal nitride layer and second metal nitride layer is zero.

The present invention also relates to a device (appliance or installation) of the chimney insert or stove or chimney or boiler or heating appliance or fireplace or fire barrier or equivalent type, this device comprising at least one plate according to the present invention. This plate is preferentially located on the front of the device, for example integrated into a door allowing access to the fireplace or integrated into the device as a window, or possibly removable, in particular in the case of a plate coupled to a fireplace in the form of a flame barrier.

The inventors have demonstrated that the substrate provided with the aforementioned stack selected according to the invention reflects infrared radiation efficiently under conditions of high temperatures without sustaining any degradation of its low-emissivity properties over time. The enveloping, on its two faces, in particular the direct enveloping (without an intermediate layer) of the indium tin oxide-based layer (functional layer) having a limited thickness, by two metal nitride layers of controlled thickness (placed on either side of the ITO layer) in which the oxygen content is advantageously limited, prevents a drop in the conductivity of said ITO layer, the assembly retaining a low emissivity over time even when subjected to significant variations in temperature.

The indium tin oxide-based layer preferably consists essentially (at least 90% by weight) or consists (only) of such an oxide (with the exception of any impurities present). The atomic percentage of Sn is preferably comprised in the range from 5 to 70%, in particular from 6 to 60%, advantageously from 8 to 12%.

The thickness of the ITO layer is preferably comprised in the range from 10 to less than 100 nm, notably from 30 to 80 nm, in particular from 40 to 70 nm, in particular may be less than 50 nm. Advantageously and generally, the ITO layer of less than 100 nm thickness of the aforementioned stack is the only ITO layer present in the entire coating or total stack which includes said stack (and other layer(s) if need be as indicated below), i.e. there are no other ITO layers in said coating/total stack. In other words, there is only one ITO layer (layer 2) in the total stack including said layer present on the glass-ceramic substrate according to the invention.

In the present invention, the expression "metal nitrides" designates both nitrides of metalloids such as silicon and nitrides of metals. Preferably according to the invention, the metal nitride layer is based on (and preferentially consists of) silicon or aluminum nitride, and particularly preferably based on silicon nitride $Si_3N_4$, in particular consists essentially of silicon nitride $Si_3N_4$. The designation "silicon nitride" does not prejudge the presence of atoms other than silicon and nitrogen, or the actual stoichiometry of the layer. Indeed, silicon nitride preferably comprises a small quantity of one or more atoms, typically aluminum or boron, added as dopants in the silicon targets used in order to increase their electronic conductivity and thus facilitate deposition by magnetron sputtering, the level of dopant(s) (such as aluminum) in the target used, as well as in the layer, preferably being less than 15% by weight, the silicon targets used comprising for example advantageously from 3 to 15% by weight of aluminum.

Preferably the thickness of the first metal nitride layer 1) is comprised between 5 and 50 nm, in particular between 10 and 45 nm, and the thickness of layer 3) is comprised between 10 and 100 nm, in particular between 15 and 90 nm.

As already mentioned above, the ITO layer is in (direct) contact on one of its faces (main faces) with layer 1) and in (direct) contact on its opposite face with layer 3). In particular, the ITO layer 2) is free of contact with any other oxide layer, in particular is free of contact with any silicon oxide layer (such as $SiO_2$), in particular and for example in the case where such oxide layers are added to the aforementioned stack (1/2/3) according to the invention.

Preferably, the aforementioned stack according to the invention is the following stack: $Si_3N_4/ITO/Si_3N_4$, having the layer thicknesses defined according to the invention.

The coating of the substrate including the aforementioned stack may, if need be, include other layers on either side and/or on the other side of the aforementioned stack.

It may for example comprise, between the substrate and the aforementioned stack, at least one layer, or one stack of layers, for example affecting for example the reflective appearance of the plate or which may serve to block possible ion migration or which may serve as a bonding layer, etc., for example a layer with a refractive index between the refractive index of the substrate and the refractive index of the ITO layer (such as a silicon oxynitride layer—with a refractive index between 1.6 and 2.1—or $Al_2O_3$ or SnZnO or silicon nitride layer deposited at higher pressure (above 5 μbar)) or a stack of layers comprising layers with a high and a low index respectively (for example $SiO_2/Si_3N_4$ or $SiO_2/TiO_2$ or $SiO_2/SnZnO$), the high-index layer being the layer closest to the substrate, or a bonding layer of silica, the thickness of this layer or these layers preferably being in a range from 1 to 20 nm. According to an advantageous embodiment of the present invention, the coating of the substrate including the aforementioned stack does not, however, include any other layer between the substrate and the aforementioned stack.

The aforementioned stack can also be coated with one or more other layers (atmosphere side). It can be coated in particular with a silicon oxide-based layer, advantageously a silica layer, for example to reduce the light reflectance of the stack, the silica can if the need arises be doped (for example with aluminum or boron atoms to facilitate its deposition by sputtering processes), the thickness of the silicon oxide-based layer preferably being comprised in the range from 1 to 50 nm.

A layer based on titanium oxide or $TiZrO_x$ or $ZrO_2$, preferably a layer of titanium oxide, can also be deposited on top of said stack, the presence of this layer making it possible in particular to reduce the scratch sensitivity of the stack, the thickness of this layer preferably being less than 10 nm, in particular comprised in a range from 1 to 5 nm.

The various embodiments described above can of course be combined with each other. The stack of thin films can be constituted successively starting from the substrate of the single stack 1/2/3 defined according to the invention, or can be constituted, successively starting from the substrate, of said stack and a layer of titanium oxide $TiO_x$ (for example $TiO_2$), or can be constituted, successively starting from the substrate, of a high-index layer and then a low-index layer, of the aforementioned stack 1/2/3, and of a titanium oxide layer, or else it can be constituted, successively starting from the substrate, of a high-index layer and then a low-index layer, of the stack 1/2/3 defined according to the invention, of a silicon oxide-based layer and a titanium oxide layer.

Some examples of particularly preferred coatings (made of thin-layer stacks) are given below:

1. Glass-ceramic/$Si_3N_4$/ITO/$Si_3N_4$
2. Glass-ceramic/$Si_3N_4$/ITO/$Si_3N_4$/$SiO_2$/$TiO_2$ The formulas given do not prejudge the actual stoichiometry of the layers, nor any possible doping. In particular, the silicon nitride and/or silicon oxide is usually doped, for example with aluminum, as mentioned above. The oxides and nitrides may not be stoichiometric (they may be, however), as the actual stoichiometry and/or possible doping may differ from one layer to the other (for example between the two $Si_3N_4$ layers).

The total thickness of the coating (including the aforementioned stack 1/2/3) is preferably comprised between 70 and 300 nm.

Preferably, the coating used according to the invention has (in the case of the aforementioned stack 1/2/3) or is chosen so as to have (in the case where other layers are added) the following colorimetric coordinates (in reflection on the coating side): $-7<a^*<5$, $-25<b^*<5$, $25<L^*<50$, these coordinates being defined in the CIE colorimetric system and being evaluated in a known manner using in particular a model CM-3700A spectrophotometer with an integrating sphere marketed by the company Minolta.

The substrate forming the plate according to the invention and on which the stack is deposited is a glass-ceramic plate of generally geometric shape, in particular rectangular, or even square, or even circular or oval, etc., and generally has one face (generally smooth) facing the user in the position of use (or visible or outer or external face), another face (generally smooth) generally hidden in the position of use (or inner face), and an edge (or thickness). This substrate is, most simply, generally flat or planar, but it can also be curved or folded depending on the applications considered (for example to be used as a fire barrier or stove window).

This substrate can be based on any glass-ceramic and advantageously has a zero or near-zero CTE, in particular less (in absolute value) than $30·10^{-7}K^{-1}$ between 20 and 700° C., in particular less than $15·10^{-7}K^{-1}$, or even less than $5·10^{-7}K^{-1}$ between 20 and 700° C.

Preferably, this substrate is transparent (i.e. has adequate transmittance in the visible area so that it can be seen through), in particular it has at least a light transmittance TL of more than 70% (for a thickness of 4 mm), particularly preferably of greater than 80% or even greater than 90%, the light transmittance TL being measured according to standard EN 410 using illuminant D65, and being the total transmittance (in particular integrated in the visible range and weighted by the sensitivity curve of the human eye), taking into account both direct transmittance and possible diffuse transmittance, the measurement being made, for example, using a spectrophotometer equipped with an integrating sphere (in particular with the spectrophotometer marketed by the company Perkin Elmer under the name Lambda 950). It can optionally be tinted in the mass, or decorated for example with enamel. The use of a so-called translucent or even opaque substrate can also be considered, although in this case the view of the fire in activity can be reduced.

The thickness of the glass-ceramic substrate is generally at least 2 mm, in particular at least 2.5 mm, and is advantageously less than 6 mm, in particular is of the order of 3 to 4.5 mm.

Preferably it is coated on its outer face (if necessary only) with the abovementioned stack; it is not excluded, however, to add for example another coating such as enamel to form a decoration (in particular also on the outer face) or to coat the other face with another stack (or even the same stack) or coating.

The addition to a glass-ceramic substrate of the aforementioned stack according to the invention comprising an ITO layer coated on its two opposite faces with a metal nitride layer on the outer face makes it possible to reflect towards the fireplace a large amount of infrared radiation without degradation of the low-emissivity properties under conditions of high temperatures and over time, unlike substrates coated with stacks which are nevertheless close together but which do not satisfy the selection criteria according to the invention. In addition, the plate obtained does not pose any maintenance, scratch or abrasion problems and retains good impact resistance properties.

The present invention also relates to a process for manufacturing the plate according to the invention as previously described. The coating or stack is deposited on the already ceramized substrate and the assembly is subjected to a heat treatment (annealing) or laser treatment enabling the ITO layer to become active and functional.

Preferably, each layer of the stack is (successively) deposited by magnetron sputtering, the ITO layer and the silicon nitride layers being easily deposited by magnetron sputtering with good efficiency and deposition rate.

During these depositions, a plasma is created under a high vacuum in the vicinity of a target (or cathode) comprising the chemical elements to be deposited or comprising elements that can react chemically with the gas contained in the plasma to form the desired layer (the so-called "reactive" process). The active species of the plasma, by bombarding the target, tear off said elements, which are deposited on the substrate forming the desired thin layer and/or react with the gas contained in the plasma to form said layer. This process makes it possible to deposit on the same line the desired stack of layers according to the invention by successively passing the substrate beneath different targets, generally in a single device comprising several vacuum chambers (or enclosures), each comprising a given target. Depending on the thickness of the layer and the deposition speed, it may also be necessary to use several successive chambers to deposit one and the same layer. The deposition is preferably done on the unheated substrate.

Sputtering is preferably of the AC (alternating current), DC (direct current) or pulsed DC type, depending on the type of generator used to bias the cathode. The targets can be planar, or preferentially tubular (in the form of rotating tubes).

The deposition of each of the metal nitride layers is carried out in particular using a target of the metal in question in an atmosphere consisting of plasmagen gas (usually argon) and nitrogen. In particular, for layers based on or essentially consisting of silicon nitride, a silicon target, generally doped with aluminum or boron to increase its electronic conductivity, is preferentially used in an atmosphere consisting of argon and nitrogen.

Advantageously, the atmosphere (consisting of plamagen gas) during each of these depositions, in each chamber where these depositions are made, comprises less than 1% by volume of oxygen (which may be residual in the chamber or possibly supplied), or is even devoid of oxygen. Preferably, the flow rate of oxygen during the deposition of each of said first metal nitride layer and second metal nitride layer is zero.

The deposition pressure (or pressure during deposition) of each of the metal nitride layers is at most 3.5 μbar, preferably is comprised in the range from 2.4 μbar to 3 μbar. "Deposition pressure" means the pressure in the chamber where the deposition of that layer is carried out. The application of the selected pressure in the deposition chamber(s) concerned also contributes to obtaining a stack the emissivity of which remains particularly stable at high temperature and over a long period of time.

The deposition power of the layers is also comprised preferably in the range from 0.5 to 4 kW/linear meter of target, during the deposition of said layers, and the running speed of the substrate beneath the various targets is preferentially comprised in the range from 0.5 to 3 m/min.

As mentioned above, the coated glass-ceramic substrate is advantageously subjected to a heat treatment (annealing) or laser treatment after deposition of the aforementioned stack/coating in order to activate the ITO layer (crystallization of the ITO to increase and improve its electrical properties), in particular is subjected to a heat treatment at a temperature above 600° C. for a few minutes to tens of minutes (even up to a few hours), in particular of the order of 650° C. to 850° C. for 5 to 10 min, this activation by annealing on the glass-ceramic substrate (which may coincide with the annealing treatment if an enamel coating is also present, for example for decorative purposes) being carried out without damaging the ITO stack or said ITO layer.

The following examples illustrate but do not limit the present invention.

COMPARATIVE EXAMPLE 1

The following stack was deposited by magnetron sputtering on one face of a transparent glass-ceramic substrate (in the form of a plate) of 4 mm thickness marketed under the name Kéralite by the company Eurokéra:

Glass-ceramic/ITO (100)/$Si_3N_4$ (45).

The numbers in brackets (in this and the following examples) correspond to the thicknesses expressed in nanometers.

The silicon nitride layer was deposited using aluminum-doped silicon targets under an argon plasma with the addition of nitrogen and without the addition of oxygen at a pressure of 2.4 to 3 μbar in an atmosphere containing less than 1% by volume of oxygen. The ITO layer was deposited using ITO targets (In/Sn targets).

The coated glass-ceramic was then subjected to a heat treatment (annealing) at 650° C. for 10 min in order to activate the ITO layer.

COMPARATIVE EXAMPLE 2

This example was carried out as in Example 1 by replacing the stack with the following stack:

Glass-ceramic/$Si_3N_4$ (20)/ITO (100).

COMPARATIVE EXAMPLE 3

This example was carried out as in Example 1 by replacing the stack with the following stack:

Glass-ceramic/$SiO_2$ (50)/ITO (130)/$Si_3N_4$ (45).

COMPARATIVE EXAMPLE 4

This example was carried out as in Example 1 by replacing the stack with the following stack:

Glass-ceramic/$Si_3N_4$ (18)/$SiO_2$ (20)/ITO (115)/$Si_3N_4$ (15)/$SiO_2$ (20)/$TiO_2$ (5).

Example According to the Invention

This example was carried out as in Example 1 by replacing the stack with the following stack:

Glass-ceramic/$Si_3N_4$ (20)/ITO (50)/$Si_3N_4$ (45).

In order to study their resistance to aging, the various coated substrates were placed in an oven at a temperature of 650° C. for 100 h (corresponding to approximately 10 years of use).

The following properties of the coated substrates were measured before and after aging at 650° C. for 100 h:
- light transmittance TL and light reflectance $R_L$ according to standard EN 410 using illuminant D65, the measurement being made using a spectrophotometer with an integrating sphere marketed by the company Perkin Elmer under the name Lambda 950.
- the color coordinates L*, a*, b*, defined in the CIE colorimetric system and evaluated using a model CM-3700A spectrophotometer with integrating sphere marketed by Minolta (reflection colorimetry) on the coated face of the stack,
- the reflectivity (expressed in %) calculated from spectra obtained by visible-infrared spectroscopy over the spectral band 250 nm-10 μm, using a model L950 spectrometer marketed by Perkin Elmer and a Spectrum 100 FTIR spectrometer marketed by Perkin Elmer, normalized by the blackbody emission spectrum 500° C. (reflectivity $R_{N500°\,C.}$) or respectively at 1200° C. (reflectivity $R_{N1200°\,C.}$),
- the square resistance (of the stack) $R_{sq}$ (expressed in ohms) and the electrical resistivity ρ (of the ITO layer) (expressed in μohm·cm), calculated from the measurement of the square resistance and the thickness of the (ITO) layer, the square resistance of the stack being measured in a known manner using a non-contact measuring device (profilometer) of the Dektak model SRM-12 type marketed by the company Naguy, the emissivity being closely correlated with the square resistance (the square resistance being easier to measure than the emissivity).

The results obtained, before ("initial") and after aging at 650° C. for 100 h ("650° C.") for the different examples are collected in the following table:

| | Ex. Comp. 1 | Ex. Comp. 2 | Ex. Comp. 3 | Ex. Comp. 4 | example A |
|---|---|---|---|---|---|
| $T_{L(initial)}$ | 83.9 | 84.9 | 78 | 82.4 | 80.2 |
| $T_{L(650°\,C.)}$ | 87.5 | 81.9 | 78.4 | 87.2 | 79.5 |
| $R_{L(initial)}$ | 11.5 | 11.7 | 17.9 | 10.9 | 14.9 |
| $R_{L(650°\,C.)}$ | 8.4 | 14.7 | 17.9 | 9 | 13.1 |
| $L^*_{(initial)}$ | 40.4 | 50.7 | 49.4 | 39.4 | 45.6 |
| $L^*_{(650°\,C.)}$ | 34.9 | 45.2 | 49.3 | 36 | 42.9 |
| $a^*_{(initial)}$ | 9.8 | 9.9 | −16 | −0.4 | −2.1 |
| $a^*_{(650°\,C.)}$ | 9.2 | 5.1 | −16.4 | 6.7 | −1.4 |
| $b^*_{(initial)}$ | −12.6 | −12.6 | −1 | −2.5 | −17.7 |
| $b^*_{(650°\,C.)}$ | −25.1 | 8.3 | 0.6 | 4.7 | −15.5 |
| $R_{N500°\,C.\,(initial)}$ | 71.4 | 26.4 | 77.8 | 73.4 | 72.7 |
| $R_{N500°\,C.\,(650°\,C.)}$ | 28.3 | 17.2 | 45.8 | 35.3 | 71 |
| $R_{N1200°\,C.\,(initial)}$ | 61.1 | 18.6 | 63 | 65.3 | 63 |
| $R_{N1200°\,C.\,(650°\,C.)}$ | 18.6 | 12.2 | 12.5 | 25.7 | 60.9 |
| $R_{sq(initial)}$ | 15.3 | 56.5 | 21 | 17.4 | 15.9 |
| $R_{sq\,(650°\,C.)}$ | 45.6 | 87.4 | 27 | 51.1 | 17 |
| $ρ_{(initial)}$ | 153 | 565 | 319 | 200 | 159 |
| $ρ_{(650°\,C.)}$ | 456 | 874 | 352 | 588 | 170 |

The results obtained clearly show that the substrate coated according to the invention does not suffer any significant degradation of its properties, in particular its low-emissivity properties, under conditions of high temperatures and over time (the reflectivity in particular remaining advantageously high and the square resistance of the stack and the electrical resistivity of the ITO layer remaining advantageously low after aging), unlike substrates coated with stacks which are nevertheless close together but do not satisfy the selection criteria according to the invention which, for their part, suffer significant degradation and also, as the case may be, have less advantageous initial properties (in particular low emissivity).

The articles according to the invention may in particular be used with advantage to make a new range of plates intended to equip appliances of the chimney insert, stove, chimney, boiler, heater, fireplace or equivalent type, and/or to serve as a fire barrier, etc.

The invention claimed is:

1. A plate configured to equip appliances of a chimney insert, stove, chimney, boiler or furnace, heating appliance, fireplace or equivalent type and/or to serve as a fire barrier, said plate comprising:
   at least one glass-ceramic substrate coated on at least one of its faces with the following stack of layers, in this order from the glass-ceramic substrate:
   1) A first silicon nitride layer having an oxygen content of less than 1% by weight and a thickness comprised in the range from 5 nm to 50 nm;
   2) An indium tin oxide layer having a thickness of 80 nm or less; and
   3) a second silicon nitride layer having a thickness comprised in the range from 10 nm to 100 nm,
   wherein the first silicon nitride layer is in direct contact with the glass-ceramic substrate and the indium tin oxide layer, wherein the indium tin oxide layer is in direct contact with the first silicon nitride layer and the second silicon nitride layer, and wherein the second silicon nitride layer is in direct contact with the indium tin oxide layer and the atmosphere.

2. The plate as claimed in claim 1, wherein each of said first silicon nitride layer and second silicon nitride layer are devoid of oxygen.

3. The plate as claimed in claim 1, wherein the thickness of the first silicon nitride layer is comprised between 10 and 45 nm, the thickness of indium tin oxide layer is comprised between 10 and 80 nm, and the thickness of the second silicon nitride layer is comprised between 10 and 90 nm.

4. The plate as claimed in claim 1, wherein said stack of layers is located on the outer face of the plate.

5. The plate as claimed in claim 1, wherein the thickness of the first silicon nitride layer is comprised between 10 and 45 nm.

6. The plate as claimed in claim 1, wherein the thickness of the second silicon nitride layer is comprised between 15 and 90 nm.

7. The plate as claimed in claim 1, wherein the thickness of the indium tin oxide layer is comprised between 10 nm and less than 50 nm.

8. The plate as claimed in claim 1, wherein an atomic percentage of Sn in the indium tin oxide is 8-12%.

9. The plate as claimed in claim 1, wherein the thickness of the first silicon nitride layer is comprised between 10 and 45 nm, and wherein the thickness of the second silicon nitride layer is comprised between 15 and 90 nm.

10. The plate as claimed in claim 9, wherein the thickness of the indium tin oxide layer is comprised between 30 nm and 80 nm.

11. The plate as claimed in claim 9, wherein said second silicon nitride layer has an oxygen content of less than 1% by weight.

12. The plate as claimed in claim 9, wherein the thickness of the indium tin oxide layer is comprised between 10 nm and less than 50 nm.

13. The plate as claimed in claim 12, wherein an atomic percentage of Sn in the indium tin oxide is 8-12%.

14. A process for manufacturing a plate as claimed in claim 1, the process comprising:
   successively depositing, by magnetron sputtering, on at least one face of at least one glass-ceramic substrate, in the following order:
   the first silicon nitride layer;
   the indium tin oxide layer; and
   the second silicon nitride layer.

15. The process as claimed in claim 14, wherein the deposition of the first silicon nitride layer and the deposition of the second silicon nitride layer are each carried out under a pressure of at most 3.5 µbar.

16. The process as claimed in claim 14, wherein an atmosphere during the deposition of each of said first silicon nitride layer and second silicon nitride layer comprises less than 1% by volume of oxygen.

17. The process as claimed in claim 14, wherein the coated glass-ceramic substrate is subjected to a heat or laser treatment.

18. The process as claimed in claim 14, wherein the deposition of the first silicon nitride layer and the deposition of the second silicon nitride layer are each carried out under a pressure in the range from 2.4 µbar to 3 µbar.

19. The process as claimed in claim 14, wherein the coated glass-ceramic substrate is subjected to a heat treatment at a temperature above 600° C. for 5 to 10 minutes.

20. A device comprising at least one plate as claimed in claim 1, wherein the device is a chimney insert, a stove, a chimney, a boiler or a furnace, a heating appliance, or a fireplace.

* * * * *